Oct. 28, 1952 A. ROSE 2,615,976

COLOR TELEVISION SYSTEM

Filed Nov. 20, 1947

INVENTOR
Albert Rose
BY [signature]
ATTORNEY

Patented Oct. 28, 1952

2,615,976

UNITED STATES PATENT OFFICE 2,615,976

COLOR TELEVISION SYSTEM

Albert Rose, Princeton, N. J., assignor to Radio Corporation of America, a corporation of Delaware Application November 20, 1947, Serial No. 787,211

7 Claims. (Cl. 178—5.4)

Figures 1, 2:
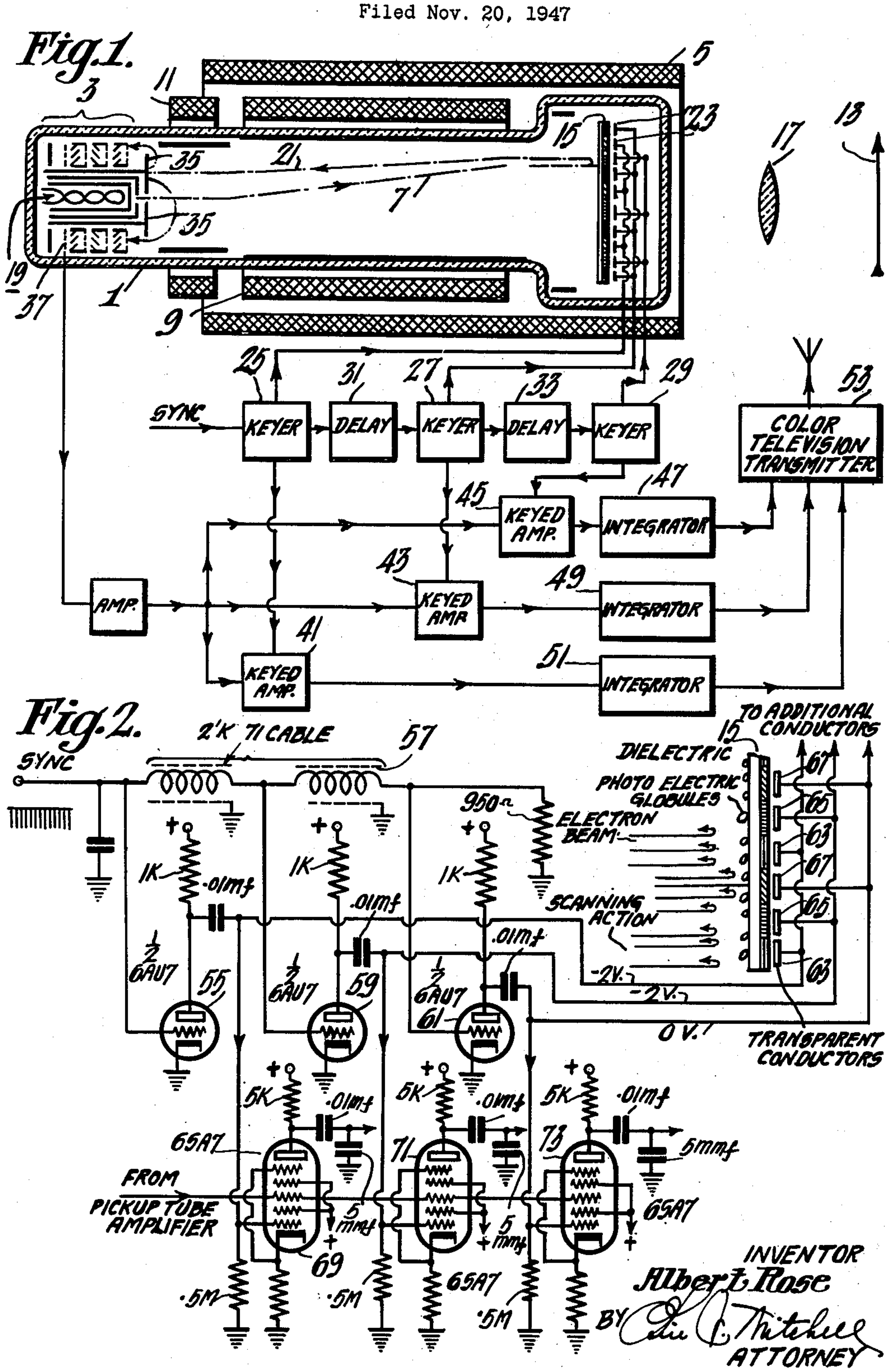

This invention relates to color television and more particularly to circuit arrangements for the conversion of colored objects into selected component color representative video signal trains.

In the popular systems that have been proposed for the transmission of television images in either black and white or in color, the image is analyzed by dividing it into elemental areas which are selected from the complete image or image area in an orderly sequence by a process of scanning to produce electrical signal indications which may then be transmitted one after another in the form of a video signal train.

As is well known in the art, reproduction of images in substantially their natural color can be accomplished by additive methods. Transmission of television images in substantially their natural color can therefore be accomplished by dividing the image, not only into its elemental areas, but also into a plurality of selected component color images which, for example, are three in number for a tricolor system.

For any of these methods, however, the several produced component color signal trains may be transmitted simultaneously when a simultaneous multicolor method is adopted, or may be broken down and transmitted in sequence where a sequential additive method is employed.

In either the simultaneous or sequential processes, the component colors into which the image is analyzed are usually chosen as red, blue and green. The addition of these several color images at the receiving points in a scanning operation similar to that occurring at the transmitting station causes the resultant viewed image replica to appear in substantially the true and natural color in which it appeared at the transmitting station.

As is also well known in the art, the simultaneous type transmission of color images provides for continuous transmission of the video signal trains representative of each of the selected component colors. A typical simultaneous type system is shown and described in an article entitled "Simultaneous All-Electronic Color Television," beginning on page 459 of the "RCA Review" for December, 1946.

The transmission by the so-called sequential process is usually accomplished through the use of moving color filters which are selected from the three primary or component colors which serve to provide the color separation when these component color filters have been positioned in the optical path along which the image is directed to the transmitting camera tube and are changed from one to another at a rapid rate. At the receiving point or points of the system, a like set of filters to that of the transmitter is located in the optical path between the image reproducing tube and the observer. The filters of both the transmitter and receiver are mechanically driven to position like selected component colors in synchronism.

A typical sequential color type system is shown and described in an article entitled "An Experimental Color Television System," beginning on page 141 of the "RCA Review" for June, 1946.

The sequential process referred to above is necessarily limited in frequency of change of component color by reason of the mechanical devices employed. It is customary to employ a field sequential rate with the employment of mechanical filter changing arrangements.

Although color images have been reproduced by the aforementioned sequential method, there are certain fundamental difficulties involved which tend to reduce the entertainment value of the sequential system. Typical difficulties involved include color action fringes, resulting from movement between individual component color scannings, color flicker, and use of mechanically moving elements, as well as others.

It will be seen that such a difficulty of color action fringes and color flicker can be largely eliminated by employing a more rapid rate of change between selected component color images. This cannot be accomplished very satisfactorily by the employment of mechanically rotating filter elements.

By the employment of electronic devices for changing from one selected component color to another selected component color, very rapidly changing systems may be employed, even to the extent of dividing each picture element into several selected component colors to eliminate entirely any difficulty resulting from color action fringes or color flicker.

According to this invention, an image pickup tube is employed which is selectively responsive by electrical control of its electrodes to any of a plurality of different selected component color images. A signal channel for each of the selected component colors is provided, and a keying circuit controllably connected to the electrodes and the signal channels to make the electrode and the corresponding color channel operative together only during predetermined sequentially recurring time intervals, which may be at an elemental sequential rate. It may also occur at a line sequential rate, frame sequential rate or any other desired rate.

A primary object of this invention is to provide an improved color television system.

Another object of this invention is to provide a color television camera which does not have registration problems.

Other and incidental objects of the invention will be apparent to those skilled in the art from a reading of the following specification and an inspection of the accompanying drawing in which Figure 1 shows in block diagram one form of this invention; and Figure 2 shows by circuit diagram the details satisfactory for employment in the form of the invention shown in Figure 1.

Turning now in more detail to Figure 1, there is shown an image pickup or camera tube 1, which takes, for purposes of example, the form of an orthicon with a signal electron multiplier 3.

The coil 5 associated with tube 1 is employed for control of the electron beam 7 and is popularly known as the focusing coil. A deflection yoke 9 and an alignment coil 11 are also provided.

Light in substantially the natural colors of object 13 is focused on a target electrode 15 by an optical system including lens 17.

Although the operation of the orthicon and other camera tubes is well described in the art, it perhaps is well, for the proper understanding of this invention, that its operation be briefly outlined here.

The popular storage type image pickup tubes have an electron gun, a photosensitive insulated surface generally referred to as the target, and a deflection means for an electron scanning beam. The scene to be transmitted is focused on the target on which it builds up, by photo emission, a charge pattern corresponding to the light and shade in the original scene. The beam of electrons generated by the electron gun is caused to scan the charge image in an orderly sequence of scanning. While a constant stream of electrons approaches the target, the stream which leaves it is modulated by the charge pattern. In one popular form (not shown), a signal plate located close to the target surface picks up the modulation by capacitances and feeds it into the grid of the first amplifier tube. The same video signal, however, appears in the modulated stream of electrons leaving the target, and in the form of the invention shown in Figure 1, the modulated stream of electrons leaving the target is employed to furnish the necessary video signal.

An electron gun 19 produces an electron beam 7 of constant beam current which scans the target 15. In the dark, the target 15 is at a potential substantially identical to that of the cathode of the electron gun, and all of the electrons constituting the beam 7 return from the target without striking it, as illustrated by a return beam 21. If part of the target 15 is illuminated and thereby driven positive by photo emission, enough beam electrons will land in this part to drive it back to cathode potential. The return beam 21 has impressed upon it by subtraction the same type video signal that an amplifier would see if connected to the target. The significant practical difference is that an amplifier lead connected to the target sees only the video signal, while an amplifier lead connected to a collector for the return beam sees the full beam current minus the video signal.

It will be seen that the modulation of the return beam is dependent upon the charge pattern on target 15. If, however, by the application of an auxiliary potential, the target 15 is driven negative, electron beam 7 will be returned without supplying any electrons to target 15, and therefore, regardless of the charge on target 15 resulting from photo emission, no modulation of the return beam 21 will occur. If, however, only certain designated conductors 23 are charged negatively, the electron beam 7 will approach target 15 opposite those conductors 23 which are not charged negatively, and the return beam 21 will be modulated in accordance with the charge placed on the target 15 by the photoelectric emission resulting from the optical image focused thereon.

By providing suitable multiple element filters in connection with target 15 and conductors 23, multiple images may be formed on the target 15. If, for example, all the conductive elements 23 connected to keyer 25 are associated with a strip of red filter or if the conductive elements themselves transmit only the red light, and all the conductive elements 23 which are connected to keyer 27 are such that they transmit only green light, and all the conductive elements 23 associated with keyer 29 conduct only blue light, it will be seen that the image which is focused on target 15 is divided into extremely narrow strip-like image elements of the selected component colors of red, green and blue. The conductors 23 are transparent and necessarily of such a small size that they are not discernible to the unaided human eye at a normal viewing distance.

It follows that if the conductors 23 associated with the green and the blue filters are charged negatively, while the conductors 23 associated with the red filters are not charged negatively, the electron beam 7 will form in its return beam 21 a video signal resulting only from the scanning of the red sections of the image. Likewise, if both the red and blue sections are charged negatively, the return beam 21 will be affected only by the photoelectric charge on the target 15, which is positioned adjacent the green designated conductors 23. Then, if the conductors 23 associated with the blue filters are permitted to remain at, for example, ground potential without a negative charge while the conductors 23 associated with the red and green filters are driven negatively, the return beam 21 will be modulated only by the photoelectric charge associated with the conductors 23 representing the blue sections.

The conductors 23 can be keyed at any desired rate, and in the form of the invention shown in Figure 1, an elemental sequential rate is provided.

Synchronizing pulses are applied to keyers 25, 27 and 29 through delay circuits 31 and 33 in such a manner that the pulses arriving on conductors 23 are in sequence and substantially uniformly spaced.

Suitable delay circuit arrangements for keyers 25, 27 and 29, together with associated keyers and amplifiers, are shown in detail in Figure 2.

The return beam 21 strikes a collector 35 and its energy multiplied in electron multiplier 3, which has a signal output electrode 37. Amplifiers 41, 43 and 45 are alternately keyed to operation by keyers 25, 27 and 29 at the same time their correspondingly designated conductors 23 receive their relatively positive charge.

If, therefore, the conductors 23, which are connected to keyer 25, have associated therewith red color filters, the lower channel, including keyed amplifier 41, transmits the video signal at the time information concerning the red image is contained in the return beam 21. Likewise, if the conductors 23 connected to the keyer 27 have associated therewith the green color filter, keyed amplifier 43 will be actuated only during the interval of time in which the electron beam 21 contains information of the green component color image.

Integrators 47, 49 and 51 are connected in the circuit to produce, so to speak, energy from keyed amplifiers 41, 43 and 45 continuously without in any way destroying the detail of the image. The reason for the integrators 47, 49 and 51 becomes obvious, when it is remembered that keyed amplifiers 41, 43 and 45 are operative sequentially and it is desired to produce a simultaneous type color television signal.

Integrators 47, 49 and 51 need not be applied, as normal circuits will tend to integrate the signals from the keyed amplifiers.

If, however, another form of this invention is practiced wherein the keyed amplifiers 41, 43 and 45 are keyed in a line sequential or frame sequential rate, integrators 47, 49 and 51 will, of course, not be employed, and color television transmitter 53 will function as a sequential transmitter transmitting only one color image signal at a time.

If, however, elemental sequential rate of change is employed, color television transmitter 53 will provide three simultaneous color signals.

Turning now in more detail to Figure 2, there is shown a suitable circuit arrangement for providing keying and sequential amplification in the practice of this invention.

A synchronizing signal, as illustrated, is applied to tube 55, which operates as the keyer illustrated as block 25 in Figure 1. An appropriate delay arrangement may, for example, take the form of the K71 cable 57 illustrated, or may take the form of the well-known delay networks involving inductance and capacity. Tubes 59 and 61 are employed respectively as keyers 27 and 29 of Figure 1.

The output signals of tubes 55, 59 and 61 are connected to conductors 63, 65 and 67, respectively.

If the circuit constants are so chosen that at the instant the incoming synchronizing pulse charges keyer 55 to cause it to transfer to conductor 63 a ground potential, the electron beam will approach the target 15 adjacent conductor 63 in such a manner that some of the electrons of the beam will deposit thereon and some will be returned, dependent upon the photoelectric charge resulting from the light image. At the same time, by reason of the delay of the synchronizing pulse through cable 57, tubes 59 and 61 will cause conductors 65 and 67 to be slightly negative with respect to ground. A potential 2 volts negative is indicated, for purposes of example.

The portion of the electron beam approaching conductors 67 and 65 will be repelled by reason of the negative charge on condensers 67 and 65. The photoelectric charge on the photoelectric globules adjacent conductors 65 and 67 will therefore have no effect on the beam current. At this instant, therefore, the only information in the return beam will be gathered from the photoelectric globules immediately adjacent the conductor 63.

By the time the synchronizing pulse has arrived at tube 59, electrodes 63 and 67 will be at a negative potential, while electrodes 65 are charged at ground potential. At this instant, the electron beam will be affected only by the photoelectric charge opposite conductors 65. Likewise, at the instant the synchronizing pulse arrives at tube 61, the photoelectric globules adjacent electrode 67 will influence the electron beam.

The tubes 55, 59 and 61 also key to operation the amplifier tubes 69, 71 and 73 in sequence to correspond with their associated conductors 63, 65 and 67.

Although the size of the electron beam was illustrated to encompass a plurality of conductors 23, the size of the electron beam may be small enough to extend over only a portion or only one of the conductors 23.

Having thus described the invention, what is claimed is:

1. A color television transmitting system comprising an image pickup tube having a common output circuit said image pickup tube including target electrodes having electrically independent and electrically modulatable intermingled groups of interconnected elements and wherein the elements of each group are sensitive to a different selected component color, a signal channel for each of said selected component colors, said signal channels each connected to said common output circuit of said image pickup tube, a plurality of keying circuits, one controllably connected to each of said groups of elements and the corresponding component color representative signal channel, said keying circuits connected in cascade through signal delay circuit arrangements and one of said keying circuits adapted to receive a sync pulse through input terminals.

2. A color television transmitting system comprising an image pickup tube having a common output circuit, said tube including image receptive target electrodes having electrically independent and electrically modulatable intermingled groups of interconnected elements each of said elements of each group being sensitive to a different selected component color and whose element size is indistinguishable to the unaided human eye, a signal channel for each of said selected component colors, said signal channels each connected to said common output circuit of said image pickup tube, and a plurality of keying circuits, one controllably connected to each of said groups of elements and the corresponding component color representative signal channel, said keying circuits connected in cascade through signal delay circuit arrangements, one of said keying circuits having input terminals, said input terminals adapted to receive a sync pulse.

3. A color television transmitting system comprising in combination an image pickup tube having a target electrode with a plurality of sections, said image pickup tube being of the type in which the component color representation of the developed image signals is electrically selectable, a signal channel for each of said selected component colors, said signal channels each connected to said image pickup tube, and a keying circuit controllably connected to each of said electrode sections and signal channels to make said electrode sections and the corresponding color channel operative together only during predetermined sequentially recurring time intervals.

4. A color television transmitting system comprising in combination an image pickup tube having a common output circuit and a multiple section image receptive target electrode, means for controlling the selected component color sensitivity of said target electrode by an electrical control, a signal channel for each of said selected component colors, said signal channels each connected to said common output circuit of said image pickup tube to receive said image signals from said image pickup tube, and a keying circuit controllably connected to each section of said multiple image receptive target and said signal channels to make said component color representative electrode sections and the corresponding component color signal channel synchronously operative during predetermined alternately recurring time intervals.

5. A color television transmitting system comprising in combination an image pickup tube having a common output circuit and image receptive target electrodes having a plurality of sections each section responsive only to one different selected component color, a signal channel for each of said selected component colors, said signal channels each connected to said common output circuit of said image pickup tube, and a plurality of keying circuits, one controllably connected to each component color representative section of said target electrode and the corresponding component color representative signal channel, said keying circuits connected in cascade through signal delay circuit arrangements, and one of said keying circuits adapted to receive through input terminals a sync pulse.

6. A color television transmitting system comprising in combination an image pickup tube having a common output circuit and wherein image signals are developed by scanning image receptive target electrodes having a section for each selected component color, a signal channel for each of said selected component colors, said signal channels each connected to said common output circuit of said image pickup tube to receive said image signals from said image pickup tube, and a plurality of keying circuits, one different keying circuit controllably connected to each component color representative section of said target electrode and the corresponding component color representative signal channel, said keying circuits connected in cascade through signal delay circuit arrangements, and one of said keying circuits adapted to receive through input terminals a sync pulse timed in accordance with said scanning.

7. A color television transmitting system comprising in combination an image pickup tube having a common output circuit and wherein image signals are developed by scanning image receptive target electrodes having a section for each selected component color, a signal channel for each of said selected component colors, said signal channels each connected to said common output circuit of said image pickup tube to receive said image signals from said image pickup tube, and a plurality of keying circuits, one controllably connected to each component color representatve section of said target electrode and the corresponding component color representative signal channel, said keying circuits connected in cascade through signal delay circuit arrangements, and one of said keying circuits adapted to receive through input terminals a sync pulse timed in accordance with said scanning to recur more rapidly than the line scanning frequency.

ALBERT ROSE.

REFERENCES CITED

The following references are of record in the file of this patent:

UNITED STATES PATENTS

| Number | Name | Date |
|---|---|---|
| 2,253,292 | Goldsmith | Aug. 19, 1941 |
| 2,294,820 | Wilson | Sept. 1, 1942 |
| 2,296,908 | Crosby | Sept. 29, 1942 |
| 2,307,188 | Bedford | Jan. 5, 1943 |
| 2,309,506 | Herbst | Jan. 26, 1943 |
| 2,337,980 | DuMont | Dec. 28, 1943 |
| 2,446,249 | Schroeder | Aug. 3, 1948 |
| 2,461,515 | Bronwell | Feb. 15, 1949 |
| 2,479,820 | De Vore | Aug. 23, 1949 |